US012413279B2

United States Patent
Taherzadeh Boroujeni et al.

(10) Patent No.: US 12,413,279 B2
(45) Date of Patent: Sep. 9, 2025

(54) BEAM SPECIFIC RMSI TRANSMISSION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Juan Montojo, San Diego, CA (US); Peter Gaal, San Diego, CA (US); Xiaoxia Zhang, San Diego, CA (US); Junyi Li, Fairless Hills, PA (US); Iyab Issam Sakhnini, San Diego, CA (US); Jing Sun, San Diego, CA (US); Jelena Damnjanovic, Del Mar, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/386,406

(22) Filed: Jul. 27, 2021

(65) Prior Publication Data
US 2022/0039139 A1 Feb. 3, 2022

Related U.S. Application Data

(60) Provisional application No. 63/059,814, filed on Jul. 31, 2020.

(51) Int. Cl.
*H04W 72/23* (2023.01)
*H04L 1/08* (2006.01)

(52) U.S. Cl.
CPC .............. *H04W 72/23* (2023.01); *H04L 1/08* (2013.01)

(58) Field of Classification Search
CPC ..... H04W 72/23; H04W 48/12; H04W 88/08; H04L 1/08; H04L 1/1812; H04B 7/0695
See application file for complete search history.

(56) References Cited

U.S. PATENT DOCUMENTS

| | | | |
|---|---|---|---|
| 2015/0181440 A1* | 6/2015 | Chen | H04L 1/08 |
| | | | 370/329 |
| 2016/0323696 A1* | 11/2016 | Moulsley | H04W 16/32 |
| 2017/0373731 A1* | 12/2017 | Guo | H04B 7/0404 |
| 2018/0115940 A1* | 4/2018 | Abedini | H04L 5/0094 |
| 2018/0324850 A1* | 11/2018 | Amuru | H04W 74/006 |
| 2019/0159203 A1* | 5/2019 | Kim | H04W 48/10 |
| 2019/0289639 A1* | 9/2019 | Frenger | H04W 72/046 |
| 2019/0306847 A1* | 10/2019 | Seo | H04L 25/0224 |
| 2019/0364603 A1* | 11/2019 | Qian | H04L 27/2605 |
| 2019/0387412 A1* | 12/2019 | Kim | H04W 56/00 |
| 2020/0178253 A1* | 6/2020 | Gao | H04L 12/4015 |
| 2020/0205095 A1* | 6/2020 | Åström | H04W 48/12 |
| 2021/0037397 A1* | 2/2021 | Guo | H04W 72/046 |

(Continued)

*Primary Examiner* — Edan Orgad
*Assistant Examiner* — Malick Sohrab
(74) *Attorney, Agent, or Firm* — Procopio, Cory, Hargreaves & Savitch LLP

(57) ABSTRACT

A configuration to allow for the transmission of system information on different beams, where different transmission parameters may be utilized for different beams. The apparatus transmits system information on a first beam. The apparatus transmits the system information on a second beam. The system information is transmitted using different parameters for the first beam and the second beam or comprises different system information content for the first beam and the second beam.

23 Claims, 10 Drawing Sheets

(56) References Cited

U.S. PATENT DOCUMENTS

2021/0184812 A1    6/2021    Molavianjazi et al.
2021/0360510 A1*  11/2021  Zheng .................... H04L 5/0012
2023/0188261 A1*   6/2023  Awadin ..................... H04L 1/08
                                                                   370/329

\* cited by examiner

BEAM SPECIFIC RMSI TRANSMISSION

CROSS REFERENCE TO RELATED APPLICATION(S)

This application claims the benefit of and priority to U.S. Provisional Application Ser. No. 63/059,814, entitled "Beam Specific RMSI Transmission" and filed on Jul. 31, 2020, which is expressly incorporated by reference herein in its entirety.

TECHNICAL FIELD

The present disclosure relates generally to communication systems, and more particularly, to wireless communication including beam specific remaining minimum system information (RMSI) transmission.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a base station. The device may be a processor and/or a modem at a base station or the base station itself. The apparatus transmits system information on a first beam. The apparatus transmits the system information on a second beam. The system information is transmitted using different parameters for the first beam and the second beam or comprises different system information content for the first beam and the second beam.

In an aspect of the disclosure, a method, a computer-readable medium, and an apparatus are provided. The apparatus may be a device at a UE. The device may be a processor and/or a modem at a UE or the UE itself. The apparatus receives scheduling information for system information including one or more transmission parameters that are beam specific. The apparatus monitors for the system information on a beam based on a transmission parameter associated with the beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
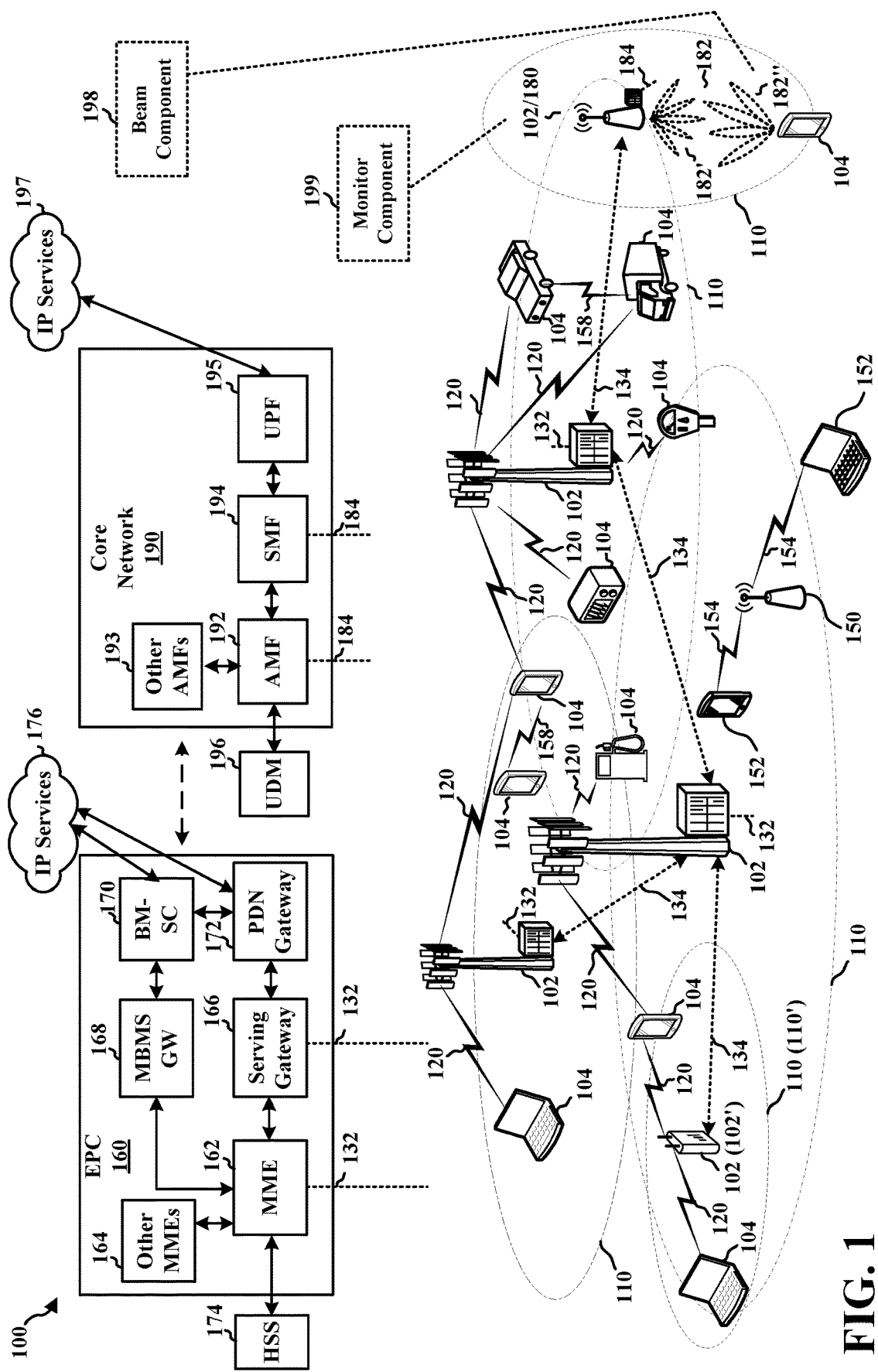
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 180 may be configured to transmit system information on different beams, where different transmission parameters may be utilized for different beams. For example, the base station 180 may comprise a beam component 198 configured to transmit system information on different beams using different transmission parameters. The base station 180 may transmit system information on a first beam. The base station 180 may transmit the system information on a second beam. The system information may be transmitted using different parameters for the first beam and the second beam or comprises different system information content for the first beam and the second beam.

Referring again to FIG. 1, in certain aspects, the UE 104 may be configured to receive system information on different beams, where different transmission parameters may be used for different beams. For example, the UE 104 may comprise a monitor component 199 configured to monitor for system information on a beam based on transmission parameters associated with the beam. The UE 104 may receive scheduling information for system information including one or more transmission parameters that are beam specific. The UE 104 may monitor for the system information on a beam based on a transmission parameter associated with the beam.

Although the following description may be focused on 5G NR, the concepts described herein may be applicable to other similar areas, such as LTE, LTE-A, CDMA, GSM, and other wireless technologies.

Figure 2:
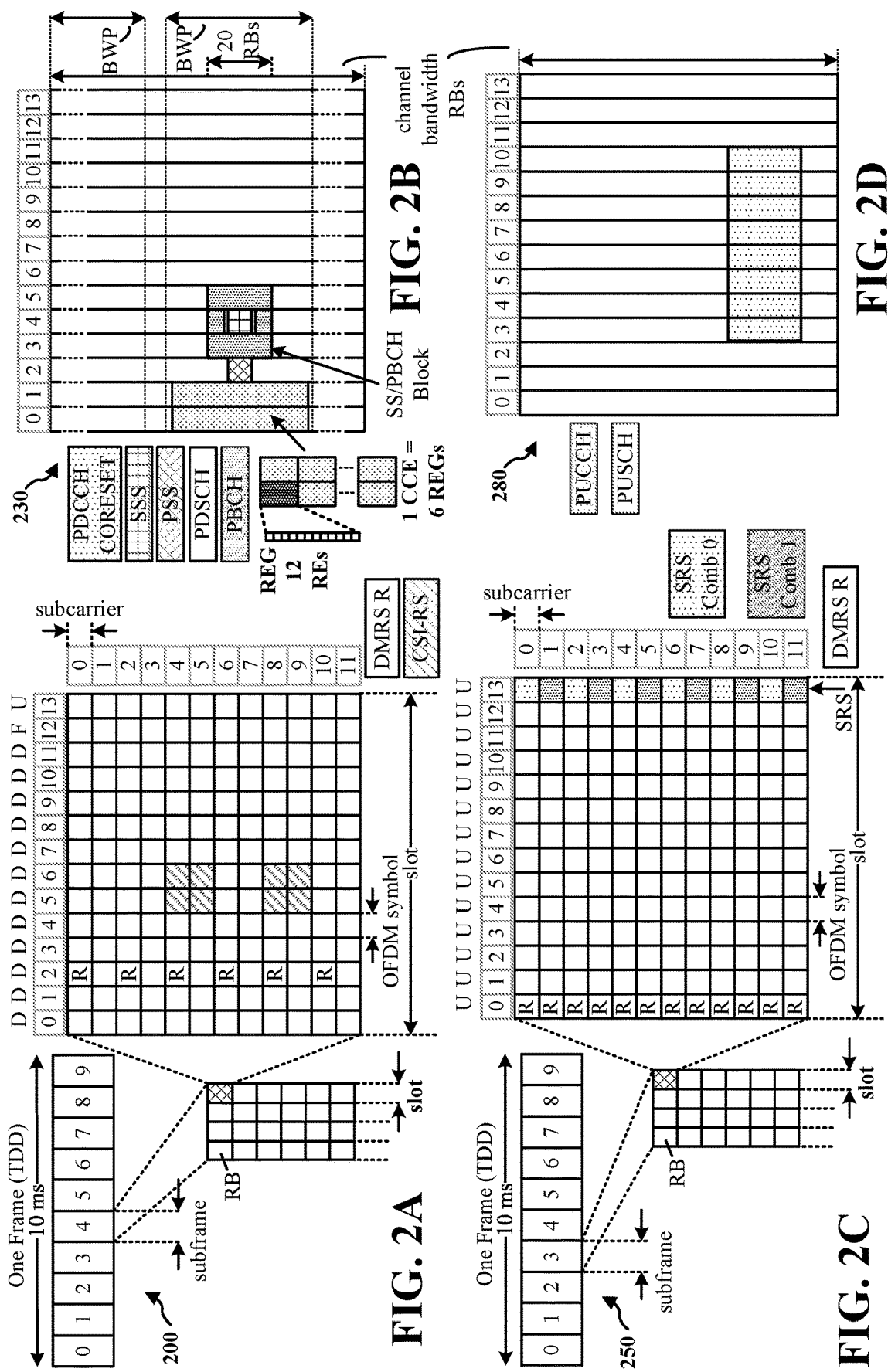
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
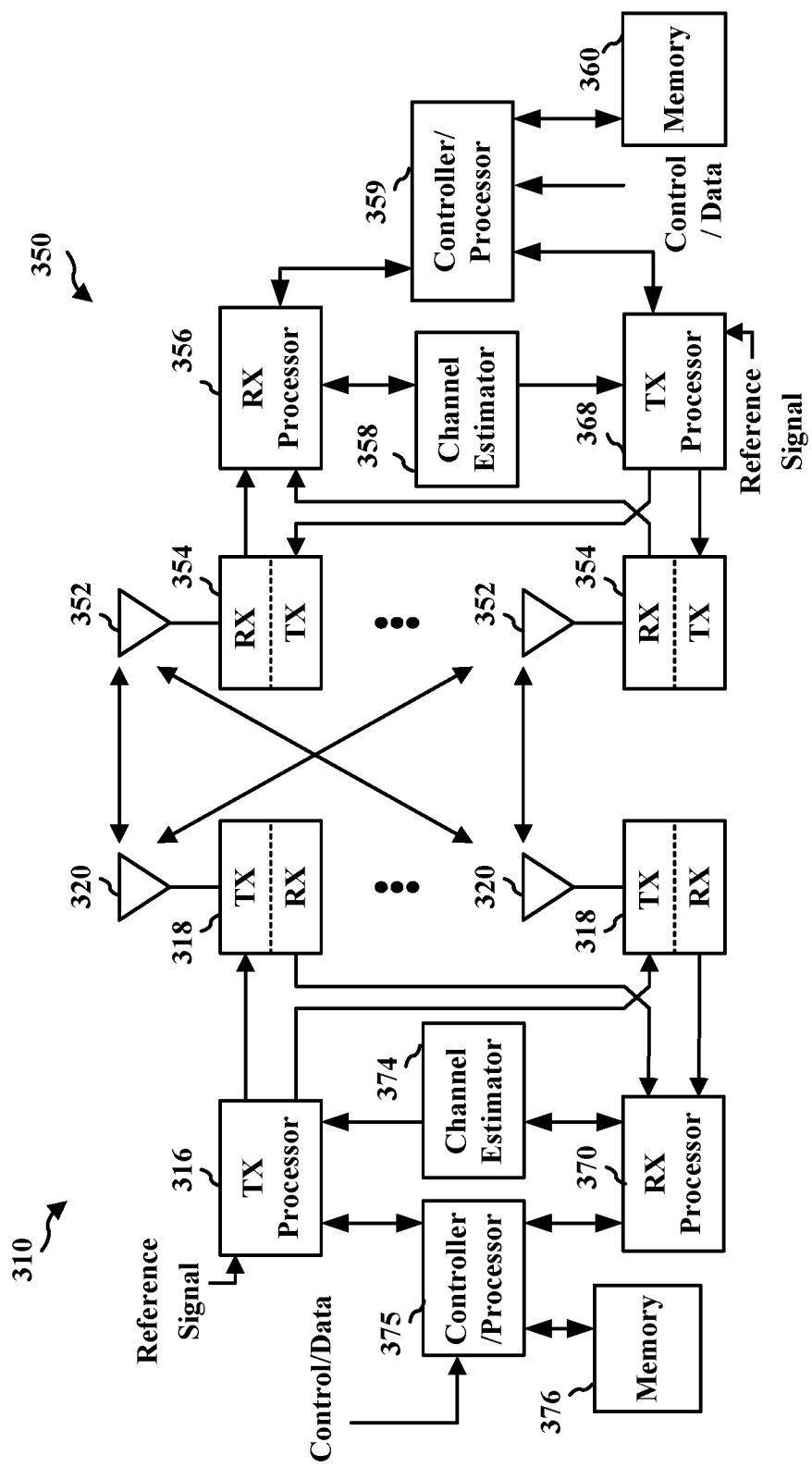
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

As illustrated in FIG. 1, a base station 102 or 180 and a UE 104 may exchange communication using beamforming 182. The base station 102 or 180 may broadcast some channels or signals using one or more beams. For example, the base station may broadcast system information for reception by UEs within coverage of the base station 102 or 180. Some types of communication, such as millimeter-wave based communication, may include channels, message, or stages that may benefit from coverage enhancement may include an adjustment of a parameter or operation to improve coverage of the channel, message, or stage, e.g., to improve reception of the channel, message, or during the stage. Some broadcast channels or stages of initial access or a RACH procedure may utilize coverage enhancements to improve signal strength or signal quality. In some examples, system information may be altered in order to allow for the use of coverage enhancements for broadcast channels or RACH procedure. In some instances, coverage enhancement may be applied to the transmission of RMSI.

Some beams used by the base station may have different coverage that other beams used by the base station. The utilization of coverage enhancement may be based on the SSB beam to address a degradation of channel conditions in one or more particular directions or to enable the signal to reach larger distances in some directions.

Figure 4A:
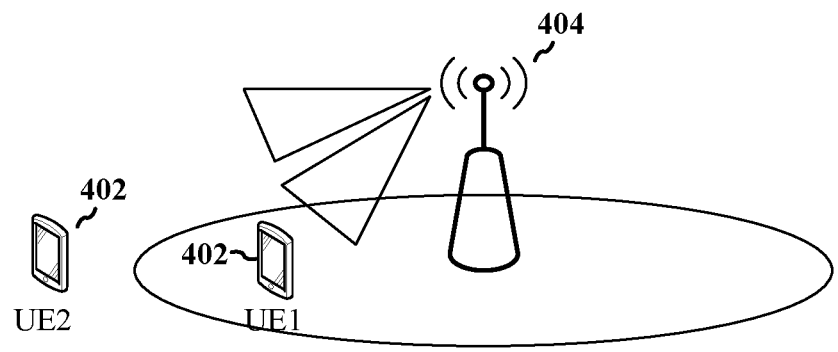
FIG. 4A is a diagram illustrating an example of a wireless communication network.
Figure 4B:
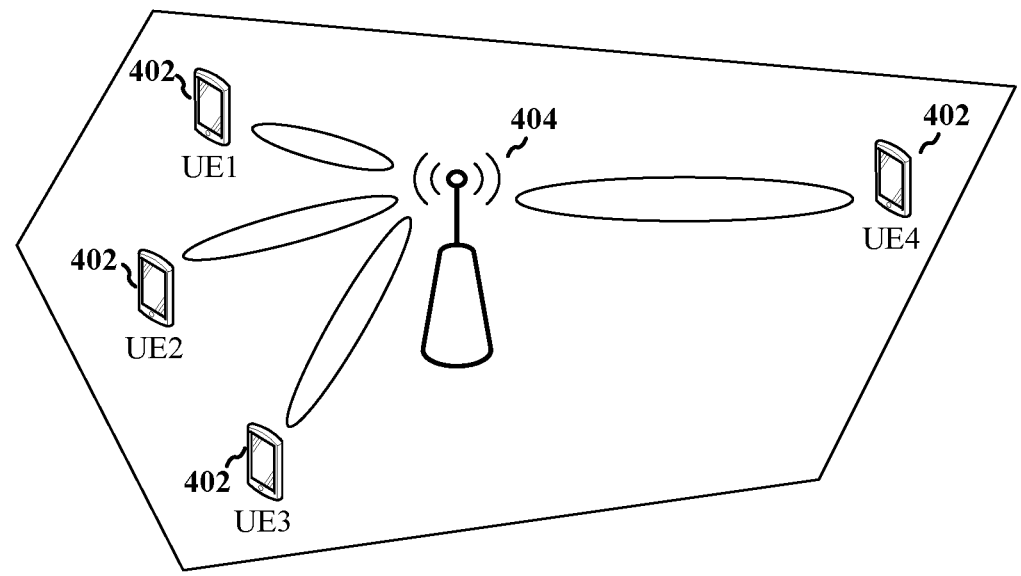
FIG. 4B is a diagram illustrating an example of a wireless communication network.

For example, as shown in the diagram 400 of FIG. 4A, a base station 404 in instances of two dimensional beamforming, may transmit downlink signals using an upper subset of beams which may correspond to half of the SSB beams and a lower subset of SSB. The upper subset of beams, may provide a larger coverage area than the lower subset of beam for some environments, such as but not limited to sub-urban environments, in order to provide coverage to UEs (e.g., UE1 402, UE2 402). In another example, as shown in the diagram 410 of FIG. 4B, the base station may utilize a coverage enhancement for one or more of the SSB beams due to UEs (e.g., UE4 402) being further away in distance than other UEs (e.g., UE1 402, UE2, 402, UE3 402) or due to the beam providing coverage to a longer distance than the other beams. The UE4 402 may be further away in distance due to the shape of the cell provided by the base station 404.

Aspects presented herein provide a configuration that allows for system information to be transmitted differently for different directions (e.g., beams). A base station may be configured to transmit system information (e.g., RMSI) differently on different beams (e.g., SSB beams). The transmission method for the system information may be based on the associated transmission beam. In some aspects, the content of the system information may be based on the associated transmission beam. The coverage enhancement utilized may comprise an increased transmission power, transmitting one or more repetitions of the transmission, applying a lower modulation and coding scheme, using a smaller transport block size, or a combination thereof. The coverage enhancement utilized may be based on the associated beam.

Beam specific coverage enhancements for the system information may be indicated by a scheduling PDCCH. In some aspects, a bit or a bitfield in the scheduling PDCCH may indicate the coverage enhancement or a method of coverage enhancement for the associated system information on the corresponding beam. The coverage enhanced system information may include system information for wireless devices that may not support coverage enhanced system information. For example, if the coverage enhancement of repetition is indicated in the scheduling PDCCH, the repetitions may include system information for UEs that do not support coverage enhanced system information along with the coverage enhanced system information. In some aspects, the coverage enhancement may be based on the frequency range or the subcarrier spacing.

Figure 5:
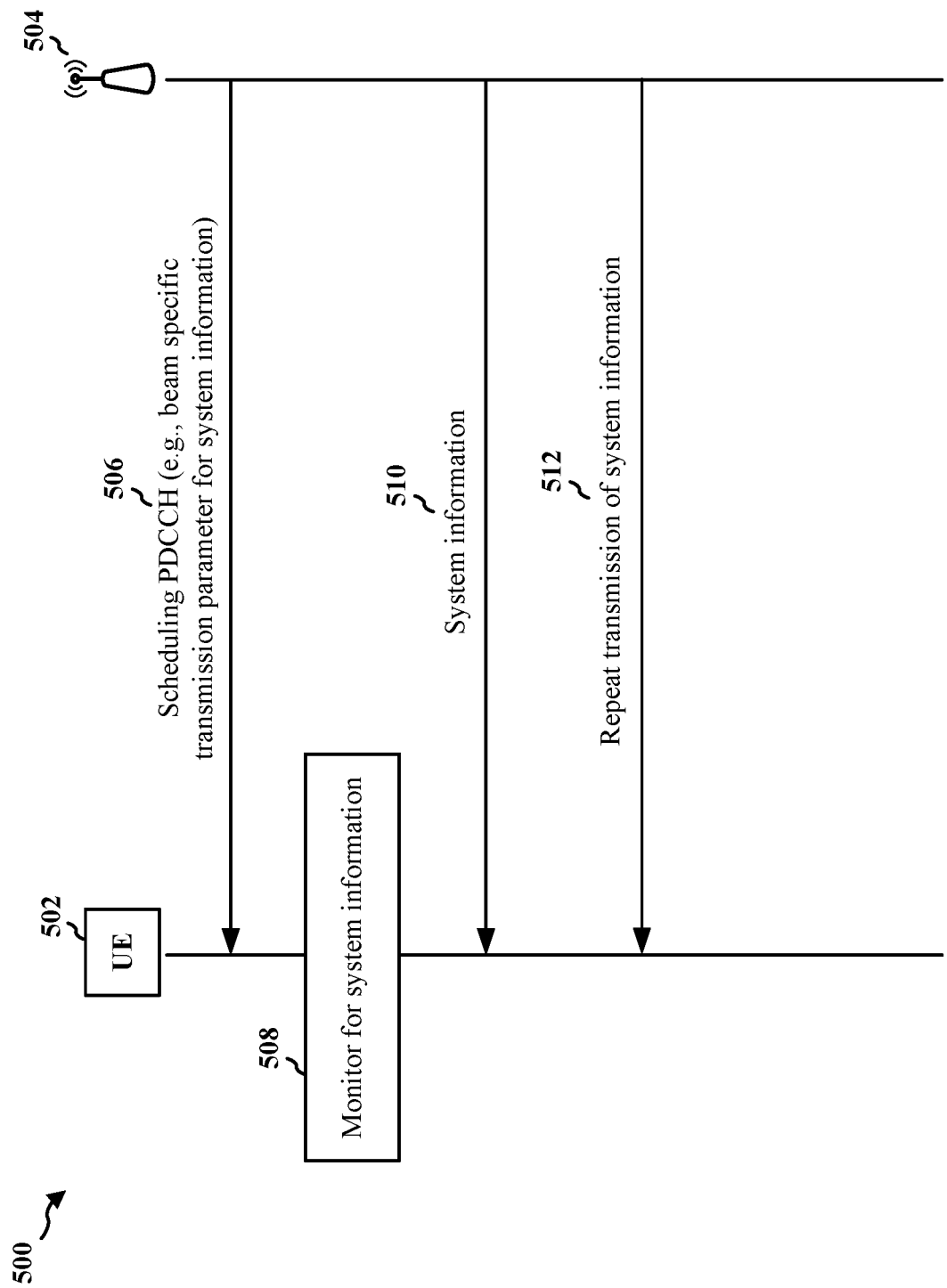
FIG. 5 illustrates an example communication flow between a UE and a base station.

FIG. 5 is a call flow diagram 500 of signaling between a UE 502 and a base station 504. The base station 504 may be configured to provide at least one cell. The UE 502 may be configured to communicate with the base station 504. For example, in the context of FIG. 1, the base station 504 may correspond to base station 102/180 and, accordingly, the cell may include a geographic coverage area 110 in which communication coverage is provided and/or small cell 102' having a coverage area 110'. Further, a UE 502 may correspond to at least UE 104. In another example, in the context of FIG. 3, the base station 504 may correspond to base station 310 and the UE 502 may correspond to UE 350.

As illustrated at 506, the base station 504 may transmit a scheduling PDCCH. The base station 504 may transmit the scheduling PDCCH to the UE 502. The UE 502 may receive the scheduling PDCCH. The scheduling PDCCH may indicate a beam specific transmission parameter for system information. In some aspects, the scheduling PDCCH may indicate a type of the transmission parameter that increases coverage for at least one beam. In some aspects, a second system information on a second beam may be transmitted with multiple repetitions for reception by one or more UEs having a first capability. At least one of the multiple repetitions may be transmitted in resources for receptions by at least one UE having a second capability. In some aspects, the first capability may be a capability to receive a coverage enhanced RMSI or RMSI repetitions. In some aspects, the second capability may be for UEs that are not capable of receiving or determining repetition information for RMSI. The scheduling PDCCH may be a scheduling RMSI PDCCH, for example.

As illustrated at 508, the UE 502 may monitor for the system information. The UE 502 may monitor for system information transmitted from the base station 504. The UE 502 may monitor for the system information on a beam on a transmission parameter associated with the beam.

As illustrated at 510, the base station 504 may transmit system information to the UE 502. The UE 502 may receive the system information. In some aspects, the base station may transmit the system information on a first beam. In some aspects, the base station may transmit the system information on a second beam. The system information may be transmitted using different parameters for the first beam and the second beam. The system information may comprise different system information content for the first beam and the second beam. In some aspects, the content of the system information may be based on respective beam from a plurality of beams used for transmitting system information. In some aspects, a transmission parameter of the system information may be based on a respective beam from a plurality of beams used for transmitting system information. The transmission parameter may be based on use of at least one beam for transmitting the system information. In some aspects, the system information may comprise remaining minimum system information (RMSI). The RMSI may be transmitted differently on different beams of a plurality of beams. In some aspects, the base station 504 may transmit the system information on the second beam using the different parameters or comprising the different system information content than for the first beam based on frequency range or a subcarrier spacing used by the base station for transmitting the system information. For example, if the base station transmits the RMSI using a first subcarrier spacing, the base station may apply coverage enhancement for one or more beams on which the RMSI is transmitted. If the base station transmits the RMSI using a second subcarrier spacing, the base station may transmit the RMSI without different coverage enhancements for one or more beams on which the RMSI is transmitted. In other examples, if the base station transmits the RMSI using a first frequency range (e.g., FR2) the base station may apply coverage enhancement for one or more beams on which the RMSI is transmitted. If the base station transmits the RMSI using a second frequency range (e.g., other than FR2), the base station may transmit the RMSI without different coverage enhancements for one or more beams on which the RMSI is transmitted.

As illustrated at 512, the base station 504 may repeat the transmission of the system information on the at least one beam. The base station 504 may repeat the transmission of the system information on the at least one beam in order to provide a coverage enhancement. In some aspects, the base station 504 may apply one or more parameters to increase coverage of a transmission. For example, the base station 504 may increase a transmission power, transmit one or more repetitions of the transmission, apply a lower modulation and coding scheme, use a smaller transport block size, or a combination thereof.

Figure 6:
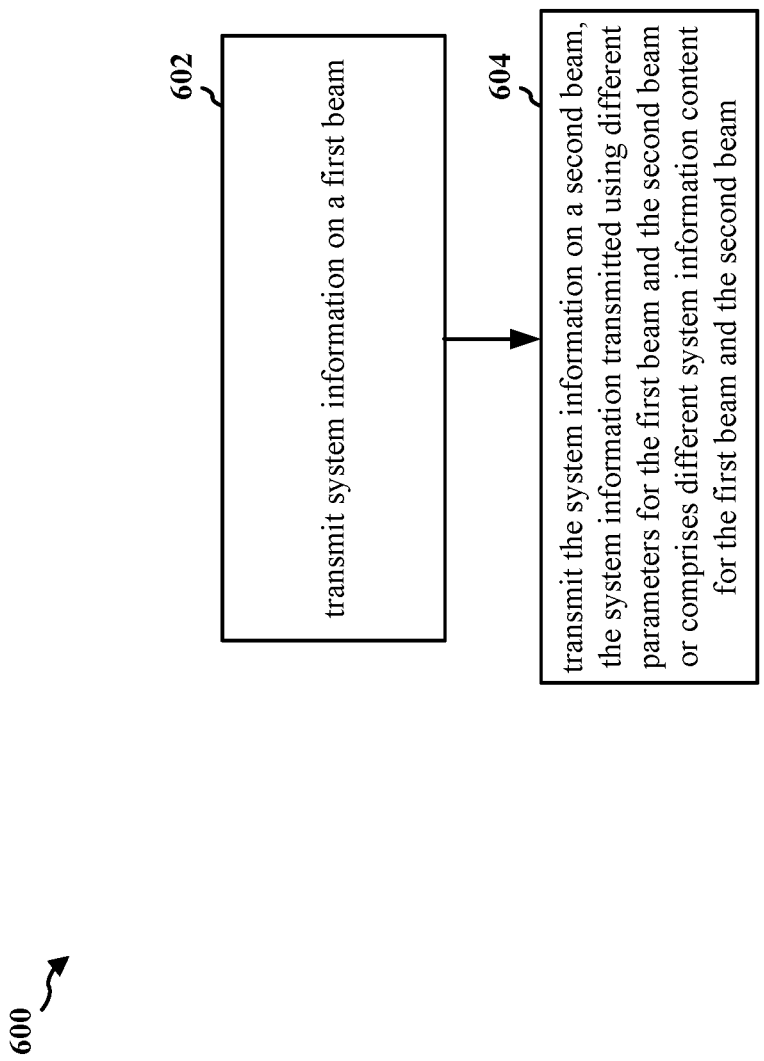
FIG. 6 is a flowchart of a method of wireless communication.

FIG. 6 is a flowchart 600 of a method of wireless communication. The method may be performed by a base station or a component of a base station (e.g., the base station 102/180, 404, 504; the apparatus 802; the baseband unit 804, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to transmit system information on different beams, where different transmission parameters may be utilized for different beams.

At 602, the base station may transmit system information. For example, 602 may be performed by beam component 842 of apparatus 802. The base station may transmit the system information on a first beam. The base station may transmit the system information to at least a UE.

At 604, the base station may transmit the system information on a second beam. For example, 604 may be performed by beam component 842 of apparatus 802. The base station may transmit the system information to at least the UE. The system information may be transmitted using different parameters for the first beam and the second beam. The system information may comprise different system information content for the first beam and the second beam. In some aspects, the content of the system information may be based on respective beam from a plurality of beams used for transmitting system information. In some aspects, a transmission parameter of the system information may be based on a respective beam from a plurality of beams used for transmitting system information. The transmission parameter may be based on use of at least one beam for transmitting the system information. In some aspects, the system information may comprise remaining minimum system information (RMSI). The RMSI may be transmitted differently on different beams of a plurality of beams. In some aspects, the base station may transmit the system information on the second beam using the different parameters or comprising the different system information content than for the first beam based on frequency range or a subcarrier spacing used by the base station for transmitting the system information.

Figure 7:
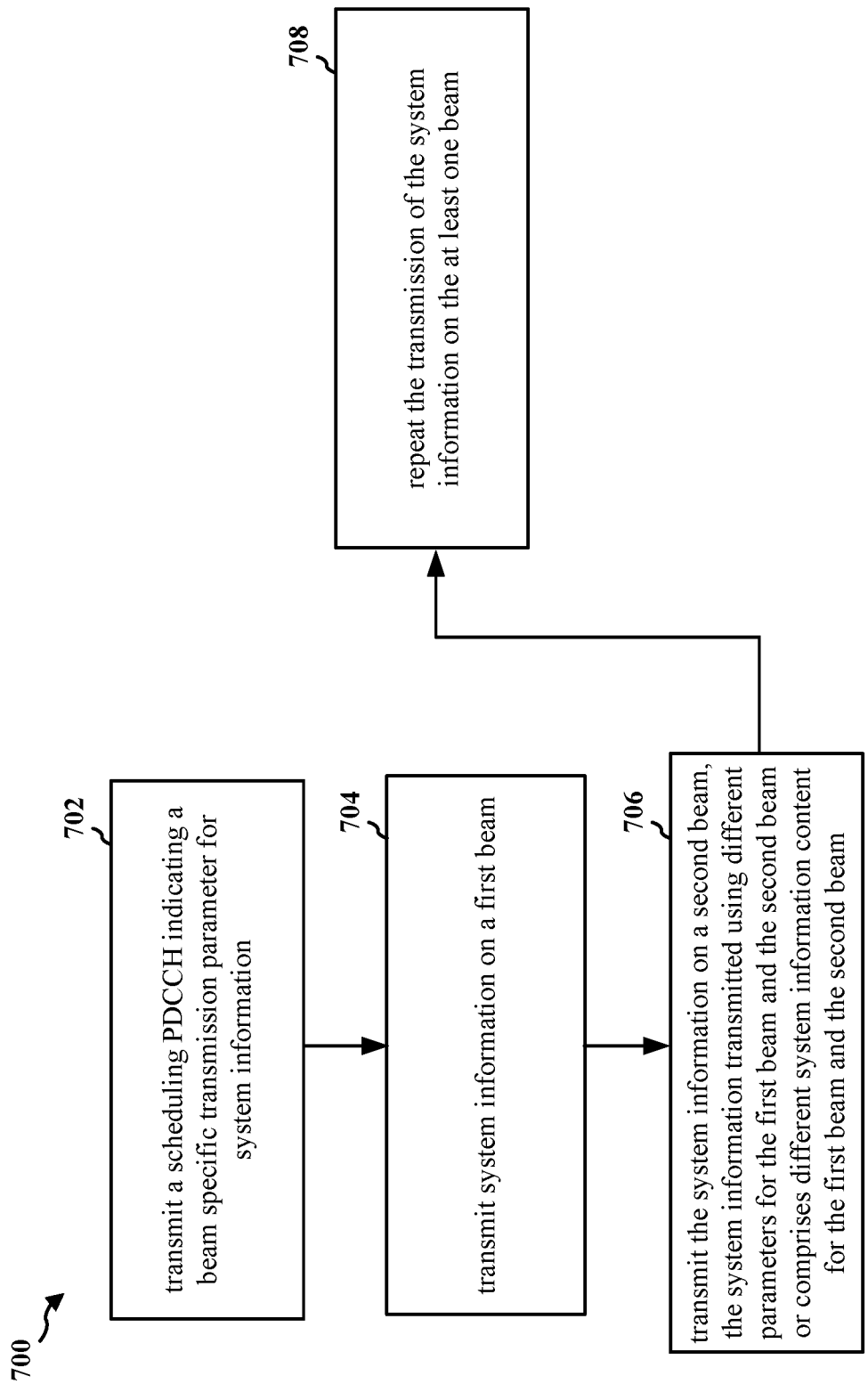
FIG. 7 is a flowchart of a method of wireless communication.

FIG. 7 is a flowchart 700 of a method of wireless communication. The method may be performed by a base station or a component of a base station (e.g., the base station 102/180, 404, 504; the apparatus 802; the baseband unit 804, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to transmit system information on different beams, where different transmission parameters may be utilized for different beams.

At 702, the base station may transmit a scheduling PDCCH. For example, 702 may be performed by schedule component 840 of apparatus 802. The base station may transmit the scheduling PDCCH indicating a beam specific transmission parameter for system information. In some aspects, the scheduling PDCCH may indicate a type of the transmission parameter that increases coverage for at least one beam. The second system information on the second beam may be transmitted with multiple repetitions for reception by one or more UEs having a first capability. At least one of the multiple repetitions may be transmitted in resources for receptions by at least one UE having a second capability. In some aspects, the first capability may be a capability to receive a coverage enhanced RMSI or RMSI repetitions. In some aspects, the second capability may be for UEs that are not capable of receiving or determining repetition information for RMSI.

At 704, the base station may transmit system information. For example, 704 may be performed by beam component 842 of apparatus 802. The base station may transmit the system information on a first beam. The base station may transmit the system information to at least a UE.

At 706, the base station may transmit the system information on a second beam. For example, 706 may be performed by beam component 842 of apparatus 802. The base station may transmit the system information to at least the UE. The system information may be transmitted using different parameters for the first beam and the second beam. The system information may comprise different system information content for the first beam and the second beam. In some aspects, the content of the system information may be based on respective beam from a plurality of beams used for transmitting system information. In some aspects, a transmission parameter of the system information may be based on a respective beam from a plurality of beams used for transmitting system information. The transmission parameter may be based on use of at least one beam for transmitting the system information. In some aspects, the system information may comprise RMSI. The RMSI may be transmitted differently on different beams of a plurality of beams. In some aspects, the base station may transmit the system information on the second beam using the different parameters or comprising the different system information content than for the first beam based on frequency range or a subcarrier spacing used by the base station for transmitting the system information.

At 708, the base station may repeat the transmission of the system information on the at least one beam. For example, 708 may be performed by repeat component 844 of apparatus 802. The base station may repeat the transmission of the system information on the at least one beam in order to provide a coverage enhancement. In some aspects, the base station may apply one or more parameters to increase coverage of a transmission. For example, the base station may increase a transmission power, transmit one or more repetitions of the transmission, apply a lower modulation and coding scheme, use a smaller transport block size, or a combination thereof.

Figure 8:
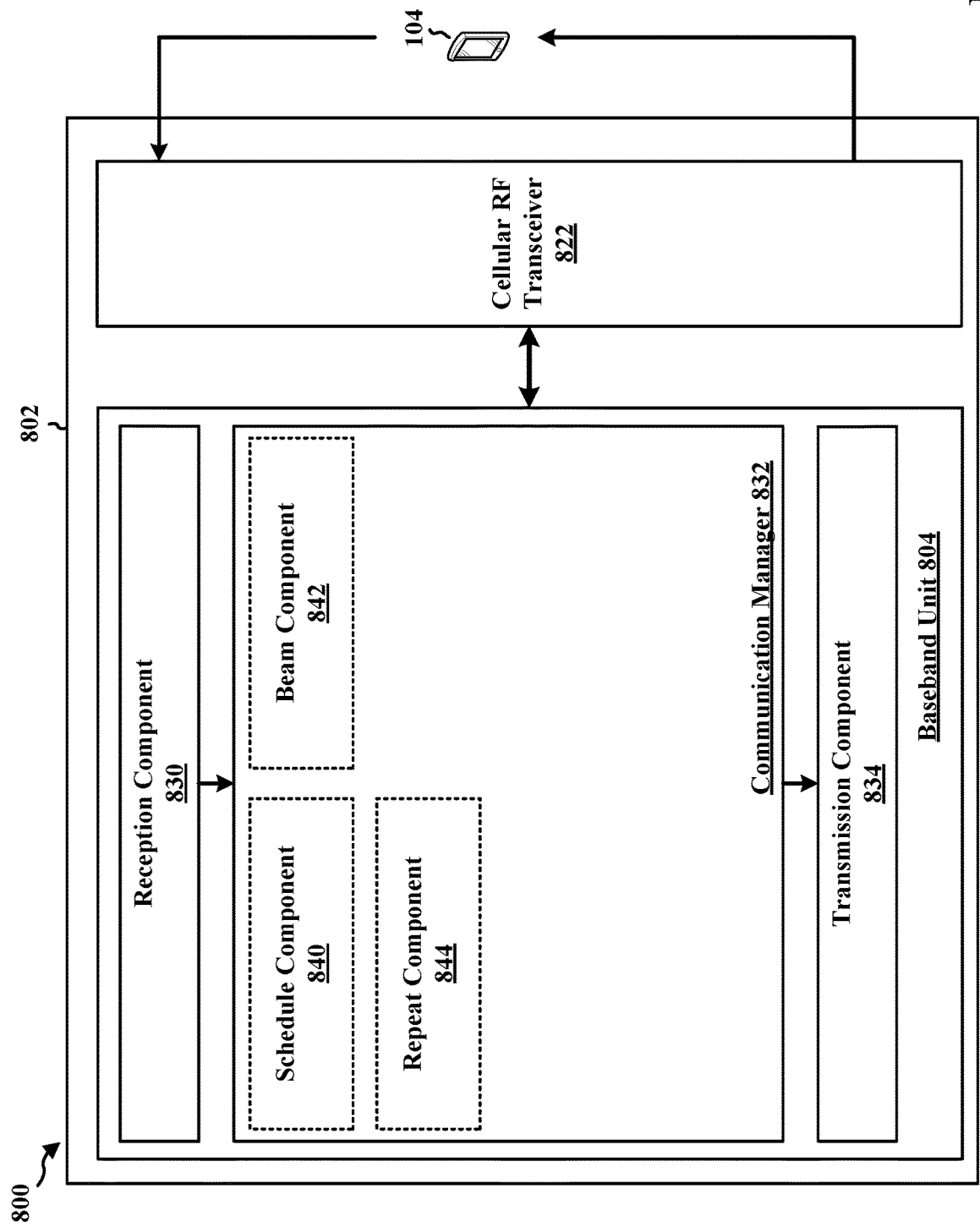
FIG. 8 is a diagram illustrating an example of a hardware implementation for an example apparatus.

FIG. 8 is a diagram 800 illustrating an example of a hardware implementation for an apparatus 802. The apparatus 802 may be a base station, a component of a base station, or may implement base station functionality. In some aspects, the apparatus 802 may include a baseband unit 804. The baseband unit 804 may communicate through a cellular RF transceiver 822 with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the base station 310 and may include the memory 376 and/or at least one of the TX processor 316, the RX processor 370, and the controller/processor 375.

The communication manager 832 includes a schedule component 840 that may transmit a scheduling PDCCH, e.g., as described in connection with 702 of FIG. 7. The communication manager 832 further includes a beam component 842 that may transmit system information, e.g., as described in connection with 602 of FIG. 6 or 704 of FIG. 7. The beam component 842 may be configured to transmit the system information on a second beam, e.g., as described in connection with 604 of FIG. 6 or 706 of FIG. 7. The communication manager 832 further includes a repeat component 844 that may repeat the transmission of the system information on the at least one beam, e.g., as described in connection with 708 of FIG. 7.

The apparatus may include additional components that perform each of the blocks of the algorithm in the flowcharts of FIG. 6 or 7. As such, each block in the flowcharts of FIG. 6 or 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the baseband unit 804, includes means for transmitting system information on a first beam. The apparatus includes means for transmitting the system information on a second beam. The system information is transmitted using different parameters for the first beam and the second beam or comprises different system information content for the first beam and the second beam. The apparatus further includes means for repeating the transmission of the system information on the at least one beam. The apparatus further includes means for transmitting a scheduling PDCCH indicating a beam specific transmission parameter for the system information. The means may be one or more of the components of the apparatus 802 configured to perform the functions recited by the means. As described supra, the apparatus 802 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 9:
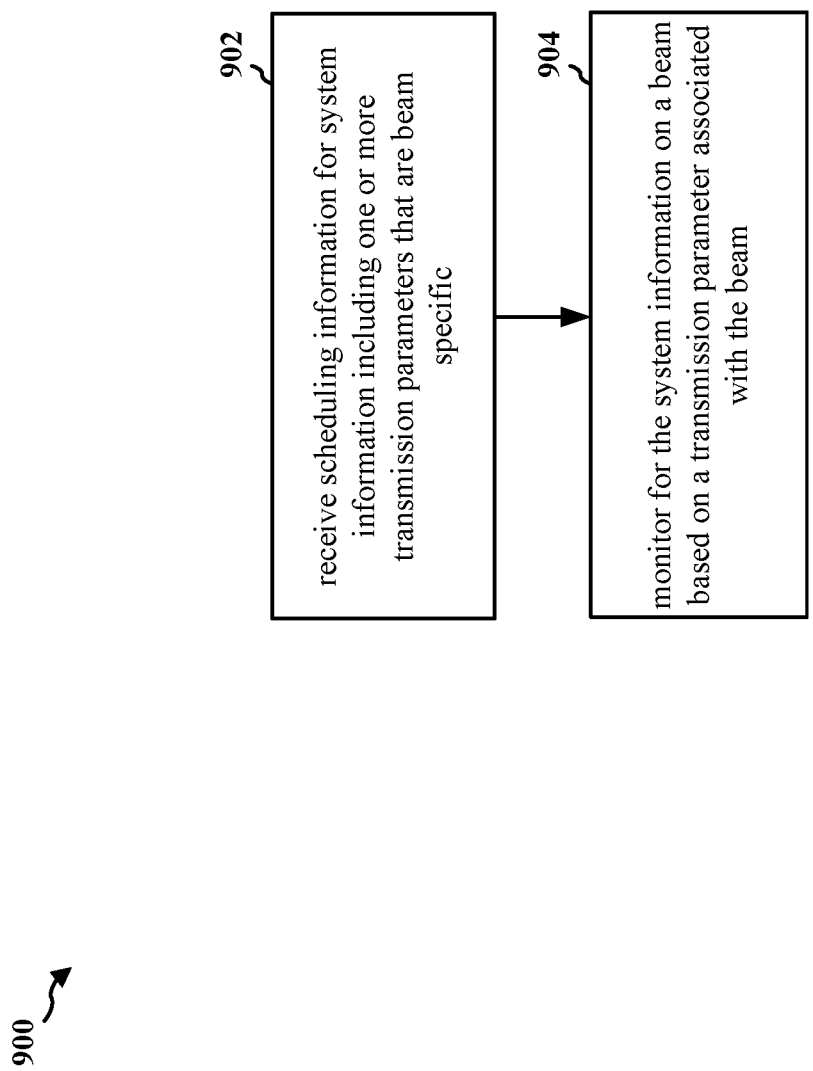
FIG. 9 is a flowchart of a method of wireless communication.

FIG. 9 is a flowchart 900 of a method of wireless communication. The method may be performed by a UE or a component of a UE (e.g., the UE 104, 402, 502; the apparatus 1002; the cellular baseband processor 1004, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure a UE to receive system information on different beams, where different transmission parameters may be utilized for different beams.

At 902, the UE may receive scheduling information. For example, 902 may be performed by schedule component 1040 of apparatus 1002. The UE may receive scheduling information for system information including one or more transmission parameters that are beam specific. The UE may receive the scheduling information from a base station. In some aspects, the system information comprises remaining minimum system information (RMSI). The scheduling information may indicate that the RMSI is transmitted differently on different beams of a plurality of beams. In some aspects, the one or more transmission parameters may increase coverage for the system information transmitted on at least one beam of a plurality of beams. The transmission parameter may comprise repetition of the system information on the at least one beam. The scheduling information may indicate a type of the transmission parameter that increases the coverage for the at least one beam.

At 904, the UE may monitor for the system information. For example, 904 may be performed by monitor component 1042 of apparatus 1002. The UE may monitor for the system information on a beam on a transmission parameter associated with the beam.

Figure 10:
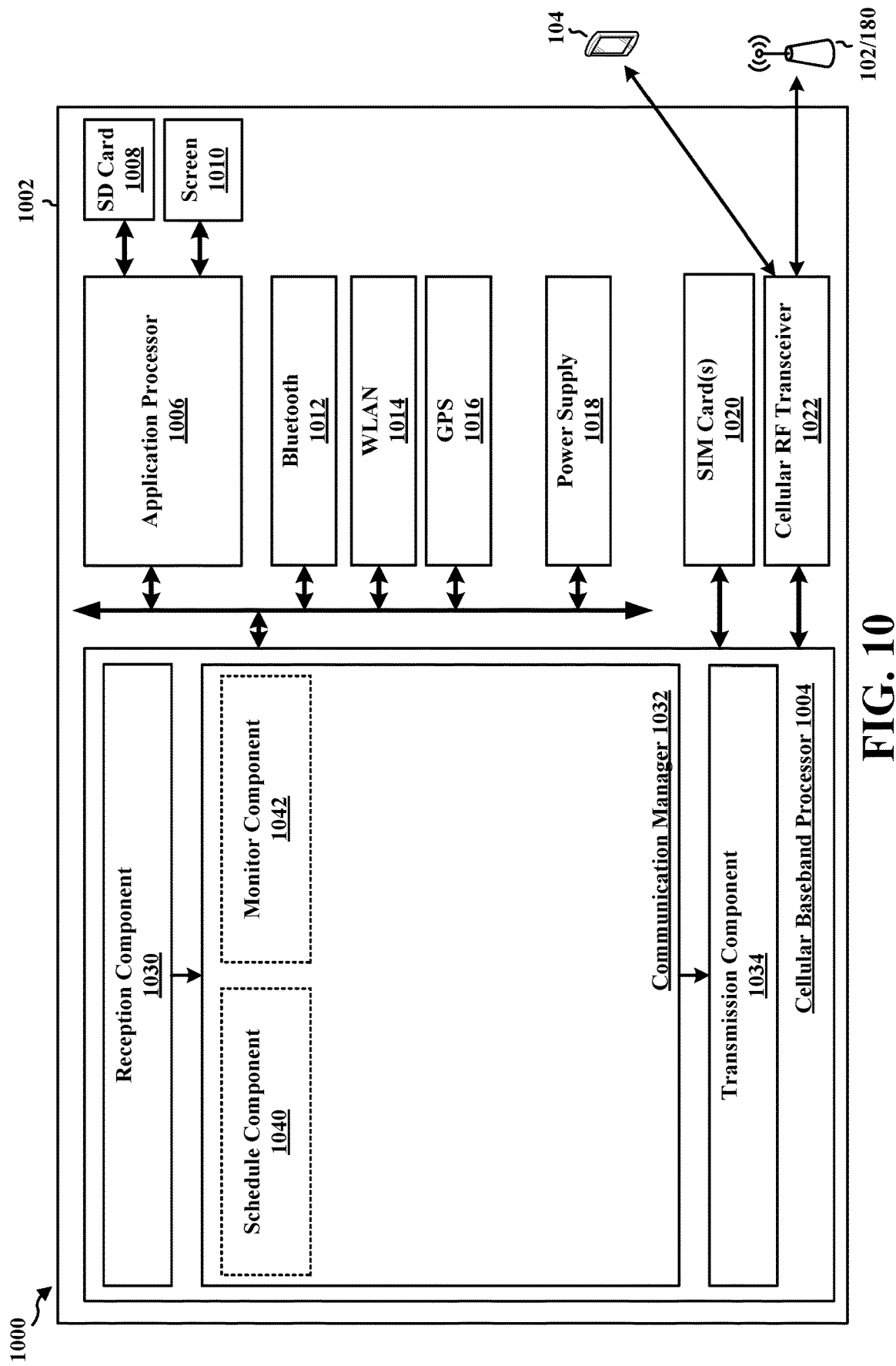
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a schedule component 1040 that is configured to receive scheduling information, e.g., as described in connection with 902 of FIG. 9. The communication manager 1032 further includes a monitor component 1042 that is configured to monitor for the system information, e.g., as described in connection with 904 of FIG. 9.

The apparatus may include additional components that perform each of the blocks of the algorithm in the flowchart of FIG. 9. As such, each block in the flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for receiving scheduling information for system information including one or more transmission parameters that are beam specific. The apparatus includes means for monitoring for the system information on a beam based on a transmission parameter associated with the beam. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station including at least one processor coupled to the memory and configured to transmit system information on a first beam; and transmit the system information on a second beam, wherein the system information is transmitted using different parameters for the first beam and the second beam or comprises different system information content for the first beam and the second beam.

Aspect 2 is the apparatus of aspect 1, further including a transceiver coupled to the at least one processor.

Aspect 3 is the apparatus of any of aspects 1 and 2, further includes that content of the system information is based on respective beam from a plurality of beams used for transmitting the system information.

Aspect 4 is the apparatus of any of aspects 1-3, further includes that a transmission parameter of the system information is based on a respective beam from a plurality of beams used for transmitting the system information.

Aspect 5 is the apparatus of any of aspects 1-4, further includes that the transmission parameter for at least one beam of a plurality of beams increases coverage for the system information transmitted on the at least one beam.

Aspect 6 is the apparatus of any of aspects 1-5, further includes that the transmission parameter configures the at least one processor to repeat transmission of the system information on the at least one beam.

Aspect 7 is the apparatus of any of aspects 1-6, further includes that the transmission parameter is based on use of at least one beam for transmitting the system information.

Aspect 8 is the apparatus of any of aspects 1-7, further includes that the system information comprises RMSI.

Aspect 9 is the apparatus of any of aspects 1-8, further includes that the RMSI is transmitted differently on different beams of a plurality of beams.

Aspect 10 is the apparatus of any of aspects 1-9, further includes that the at least one processor is further configured to transmit a scheduling PDCCH indicating a beam specific transmission parameter for the system information.

Aspect 11 is the apparatus of any of aspects 1-10, further includes that the scheduling PDCCH indicates a type of the transmission parameter that increases coverage for at least one beam.

Aspect 12 is the apparatus of any of aspects 1-11, further includes that the system information on the second beam is transmitted with multiple repetitions for reception by one or more UEs having a first capability, and wherein at least one of the multiple repetitions is transmitted in resources for receptions by at least one UE having a second capability.

Aspect 13 is the apparatus of any of aspects 1-12, further includes that the base station transmits the system information on the second beam using the different parameters or comprising the different system information content than for the first beam based on frequency range or a subcarrier spacing used by the base station for transmitting the system information.

Aspect 14 is a method of wireless communication for implementing any of aspects 1-13.

Aspect 15 is an apparatus for wireless communication including means for implementing any of aspects 1-13.

Aspect 16 is a computer-readable medium storing computer executable code, where the code when executed by a processor causes the processor to implement any of aspects 1-13.

Aspect 17 is an apparatus for wireless communication at a UE including at least one processor coupled to a memory and configured to receive scheduling information for system information including one or more transmission parameters that are beam specific; and monitor for the system information on a beam based on a transmission parameter associated with the beam.

Aspect 18 is the apparatus of aspect 17, further including a transceiver coupled to the at least one processor.

Aspect 19 is the apparatus of any of aspects 17 and 18, further includes that the system information comprises RMSI.

Aspect 20 is the apparatus of any of aspects 17-19, further includes that the scheduling information indicates that the RMSI is transmitted differently on different beams of a plurality of beams.

Aspect 21 is the apparatus of any of aspects 17-20, further includes that the one or more transmission parameters increase coverage for the system information transmitted on at least one beam of a plurality of beams.

Aspect 22 is the apparatus of any of aspects 17-21, further includes that the transmission parameter comprises repetition of the system information on the at least one beam.

Aspect 23 is the apparatus of any of aspects 17-22, further includes that the scheduling information indicates a type of the transmission parameter that increases the coverage for the at least one beam.

Aspect 24 is a method of wireless communication for implementing any of aspects 17-23.

Aspect 25 is an apparatus for wireless communication including means for implementing any of aspects 17-23.

Aspect 26 is a computer-readable medium storing computer executable code, where the code when executed by a processor causes the processor to implement any of aspects 17-23.

What is claimed is:

1. An apparatus for wireless communication at a base station, comprising:
   memory; and
   at least one processor coupled to the memory and configured to:
   transmit a scheduling physical downlink control channel (PDCCH) transmission indicating a first beam specific transmission parameter for transmission of system information on a first beam of a cell and a second beam specific transmission parameter for transmission of the system information on a second beam;
   transmit the system information of the cell on the first beam based on the first beam specific transmission parameter; and
   transmit the system information of the cell on the second beam based on the second beam specific transmission parameter, wherein the system information of the cell is transmitted using different transmission parameters that provide different beam specific levels of coverage for the system information on the first beam and the system information on the second beam, wherein a transmission parameter of the system information of the cell is based on a respective beam from a plurality of beams used for transmitting the system information to provide the different beam specific levels of coverage for different directions, and wherein the second beam specific transmission parameter for the system information on the second beam increases the coverage for the system information transmitted on the second beam in comparison to the coverage for the system information transmitted on the first beam.

2. The apparatus of claim 1, further comprising a transceiver coupled to the at least one processor.

3. The apparatus of claim 1, wherein content of the system information of the cell is different based on the respective beam from the plurality of beams used for transmitting the system information.

4. The apparatus of claim 1, wherein the transmission parameter configures the at least one processor to:
   repeat transmission of the system information of the cell on the second beam and not on the first beam.

5. The apparatus of claim 1, wherein the transmission parameter is based on use of at least one beam for transmitting the system information of the cell.

6. The apparatus of claim 1, wherein the system information comprises remaining minimum system information (RMSI).

7. The apparatus of claim 6, wherein the RMSI is transmitted differently on different beams of the plurality of beams.

8. The apparatus of claim 1, wherein the base station transmits the system information on the second beam using the different transmission parameters or comprising different system information content than for the first beam based on frequency range or a subcarrier spacing used by the base station for transmitting the system information.

9. An apparatus for wireless communication at a base station, comprising:
   memory; and
   at least one processor coupled to the memory and configured to:
   transmit a scheduling physical downlink control channel (PDCCH) transmission indicating a first beam specific transmission parameter for transmission of system information on a first beam of a cell and a second beam specific transmission parameter for transmission of the system information on a second beam;
transmit the system information of the cell on the first beam based on the first beam specific transmission parameter; and
transmit the system information of the cell on the second beam based on the second beam specific transmission parameter, wherein the system information of the cell is transmitted using different transmission parameters on the first beam and the second beam that provide different beam specific levels of coverage for the system information on the first beam and the system information on the second beam, wherein the scheduling PDCCH transmission indicates a type of transmission parameter that increases the coverage for the system information on the second beam in comparison to the system information on the first beam to provide the different beam specific levels of coverage for different directions.

10. An apparatus for wireless communication at a base station, comprising:
memory; and
at least one processor coupled to the memory and configured to:
transmit a scheduling physical downlink control channel (PDCCH) transmission indicating a first beam specific transmission parameter for system information on a first beam of a cell and a second beam specific transmission parameter for transmission of the system information on a second beam;
transmit the system information of the cell on the first beam based on the first beam specific transmission parameter; and
transmit the system information of the cell on the second beam based on the second beam specific transmission parameter, wherein the system information of the cell is transmitted using different transmission parameters on the first beam and the second beam that provide different beam specific levels of coverage for the system information on the first beam and the system information on the second beam, wherein the system information on the second beam is transmitted with multiple repetitions for reception by one or more user equipments (UEs) having a first capability to provide increased coverage for the system information transmitted on the second beam in comparison to a coverage for the system information transmitted on the first beam to provide the different beam specific levels of coverage for different directions, and wherein at least one of the multiple repetitions is transmitted in resources for receptions by at least one UE having a second capability.

11. A method of wireless communication at a base station, comprising:
transmitting a scheduling physical downlink control channel (PDCCH) transmission indicating a first beam specific transmission parameter for transmission of system information on a first beam of a cell and a second beam specific transmission parameter for transmission of the system information on a second beam;
transmitting the system information of the cell on the first beam based on the first beam specific transmission parameter; and
transmitting the system information of the cell on the second beam based on the second beam specific transmission parameter, wherein the system information of the cell is transmitted using different transmission parameters that provide different beam specific levels of coverage for the system information on the first beam and the system information on the second beam, wherein a transmission parameter of the system information of the cell is based on a respective beam from a plurality of beams used for transmitting the system information to provide the different beam specific levels of coverage for different directions, wherein the second beam specific transmission parameter for the system information on the second beam increases the coverage for the system information transmitted on the second beam in comparison to the coverage for the system information transmitted on the first beam.

12. The method of claim 11, further comprising:
repeating transmission of the system information of the cell on the second beam based on the second beam specific transmission parameter.

13. The method of claim 11, further comprising:
transmitting a scheduling PDCCH transmission indicating a beam specific transmission parameter for the system information of the cell.

14. An apparatus for wireless communication at a user equipment (UE), comprising:
memory; and
at least one processor coupled to the memory and configured to:
receive a scheduling physical downlink control channel (PDCCH) transmission including information for system information of a cell on one or more of a plurality of beams including a first beam specific transmission parameter for transmission of the system information on a first beam of the cell and a second beam specific transmission parameter for transmission of the system information on a second beam; and
monitor for the system information of the cell on a beam based on a transmission parameter associated with the beam, wherein the system information of the cell on different beams are associated with different transmission parameters that provide different levels of coverage for the system information in different directions, and wherein the second beam specific transmission parameter increases the coverage for the system information transmitted on the second beam in comparison to at least the first beam of the plurality of beams.

15. The apparatus of claim 14, further comprising a transceiver coupled to the at least one processor.

16. The apparatus of claim 14, wherein the system information comprises remaining minimum system information (RMSI).

17. The apparatus of claim 16, wherein the information indicates that the RMSI is transmitted differently on the different beams of the plurality of beams.

18. The apparatus of claim 14, wherein the second beam specific transmission parameter further comprises repetition of the system information on the beam.

19. The apparatus of claim 14, wherein the information indicates a type of the transmission parameter that increases the coverage for the beam.

20. A method of wireless communication at a user equipment (UE), comprising:

receive a scheduling physical downlink control channel (PDCCH) transmission including information for system information of a cell on one or more of a plurality of beams including a first beam specific transmission parameter for transmission of the system information on a first beam of the cell and a second beam specific transmission parameter for transmission of the system information on a second beam; and monitoring for the system information of the cell on a beam based on a transmission parameter associated with the beam, wherein the system information of the cell on different beams are associated with different transmission parameters that provide different levels of coverage for the system information in different directions, and wherein the second beam specific transmission parameter increases the coverage for the system information transmitted on the second beam in comparison to at least the first beam of the plurality of beams.

21. The method of claim 20, wherein the system information comprises remaining minimum system information (RMSI).

22. The method of claim 21, wherein the information indicates that the RMSI is transmitted differently on the different beams of the plurality of beams.

23. The method of claim 20, wherein the second beam specific transmission parameter comprises repetition of the system information on the beam.

* * * * *